March 5, 1968 W. DZIEKAN ET AL 3,372,241

MULTITRACK ERASE HEAD

Filed Oct. 22, 1963 2 Sheets-Sheet 1

INVENTORS
Werner Dziekan &
Harald Harkensee
BY Spencer & Kaye
ATTORNEYS

INVENTORS

Werner Dziekan &

Harald Harkensee

BY Spencer & Kaye

ATTORNEYS

Patented Mar. 5, 1968

3,372,241
MULTITRACK ERASE HEAD

Werner Dziekan and Harald Harkensee, Wedel, Holstein, Germany, assignors to Telefunken Patentverwertungs-G.m.b.H., Ulm (Danube), Germany
Filed Oct. 22, 1963, Ser. No. 318,027
Claims priority, application Germany, Oct. 22, 1962, T 22,897; May 18, 1963, T 24,017
6 Claims. (Cl. 179—100.2)

ABSTRACT OF THE DISCLOSURE

A magnetic erasing head for multiple track tape recorders in which a plurality of spaced core halves are attached at one end to a common core plate which is as wide as the magnetic tape for the recorder, each of the spaced core halves being as wide as a single track of the magnetic tape and being separated from the common core plate by an air gap, with an individual winding for each of the spaced core halves and circuit means for energizing all of the windings simultaneously to erase the entire magnetic tape or fore individually energizing selected windings to erase the corresponding individual track.

The present invention relates generally to the magnetic recording art, and, more particularly, to erase head arrangements for multiple track tape recorders.

When such recorders are to be used selectively as single track and multiple track or stereo recorders, a separate erase head has to be provided for each track. In view of the fact that tapes are used selectively in tape recorders in which the entire width of the band is used for recording, or in which there are two tracks on the tape, or in which there are four tracks on the tape, it is essential that a tape be erased completely in multiple track tape recorders. In known multiple track tape recorders the erase heads are generally so arranged that the space between the tracks which is different in half track and stereo tape recorders, is not affected by the erasing field.

While it would be technically possible to arrange two erase head systems so closely to each other that the interspace between the tracks which is not swept over by the erase heads is nevertheless erased due to lateral leakage or stray fields, such an arrangement brings with it certain disadvantages. For one thing, with monotrack operation, the adjacent track is also erased due to the magnetic intercoupling of the two closely adjacent erase systems and this can not be avoided.

There also exists a double-track erase head arrangement in which one of the systems is designed or dimensioned so as to be approximately equal to the pertaining track width, while the other system is substantially wider than the track with which it is associated and which extends from the edge to the middle of the tape. The drawback of this erase head is that, despite the activation of both systems, there will still be an unreased zone after the tape runs through once. This zone can only be erased by turning the tape and running it through a second time. This arrangement is therefore not suitable if there are two equal tracks on the tape.

In multiple track double gap erase heads it has also been proposed to make the widths of the core halves along the direction of travel of the tape different, and to make this difference such that the first gap of one system and the second gap of the other system extend to the middle of the tape. This will enable the tape to be erased completely after having travelled through but once, but the drawback of such an arrangement is that the structure of the erase head becomes very complicated and that here, too, the problem of over-erasing, i.e., erasing the other track upon mono-operation, is not solved in a satisfactory manner.

With these defects of the prior art in mind it is a main object of the present invention to provide a multiple track erase head arrangement which overcomes the drawbacks of prior art arrangements.

Another object is to provide a multiple track erase head arrangement which can be used to satisfactorily erase the entire width of a magnetic band or any selected track or tracks on it.

These objects and others ancillary thereto are accomplished in accordance with preferred embodiments of the invention wherein a multiple track erase head arrangement is provided in which only one core half of each system is as wide as the track with which it is associated and carries a coil, while the other core half comprises a single plate which corresponds to the width of the magnetic tape. This plate bridges, along the plane of the gap, the pole ends of the core halves which are provided with the coils. The winding direction of the coils, and the exciter current are so arranged that when all the coils are energized simultaneously, a flux of the same phase and of approximately the same size will traverse that edge of the plate which bounds the working gaps and throughout its entire length.

It is known in multiple track erase heads, to fashion one of the halves of the head as a plate which bridges the pole ends of the other half of the head, the latter being provided with systems incorporating coils. Here, however, the polarity of the coils is of no importance and the exciter current is so dimensioned that the stray field into the space between the tracks is as small as possible.

According to the present invention, the space between the tracks is erased completely. At the same time the head is of exceptionally simple construction, without this having any influence on the neighboring track upon monotrack operation. Here it is immaterial whether the head is arranged for but two tracks or any number of plurality of tracks.

Additional objects and advantages of the present invention will become apparent upon consideration of the following description when taken in conjunction with the accompanying drawings in which.

Figure 3:
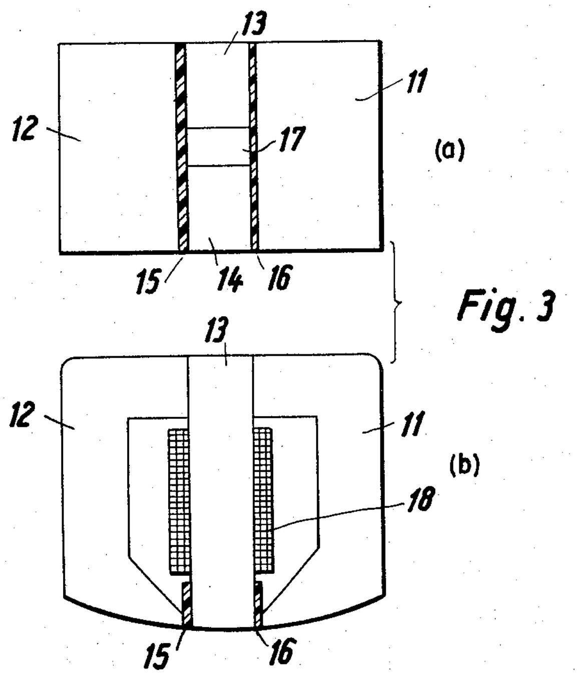

FIGURES 3*a* and 3*b* are front and side views, respectively, of a further embodiment of a two-track erase head according to the present invention.

Figure 4:
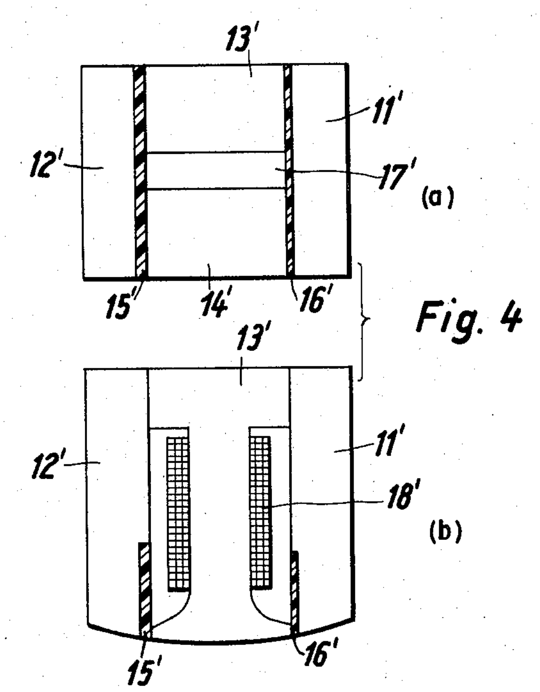

FIGURES 4*a* and 4*b* are front and side views, respectively, of yet another embodiment of a double track erase head according to the present invention.

Figures 1, 2:
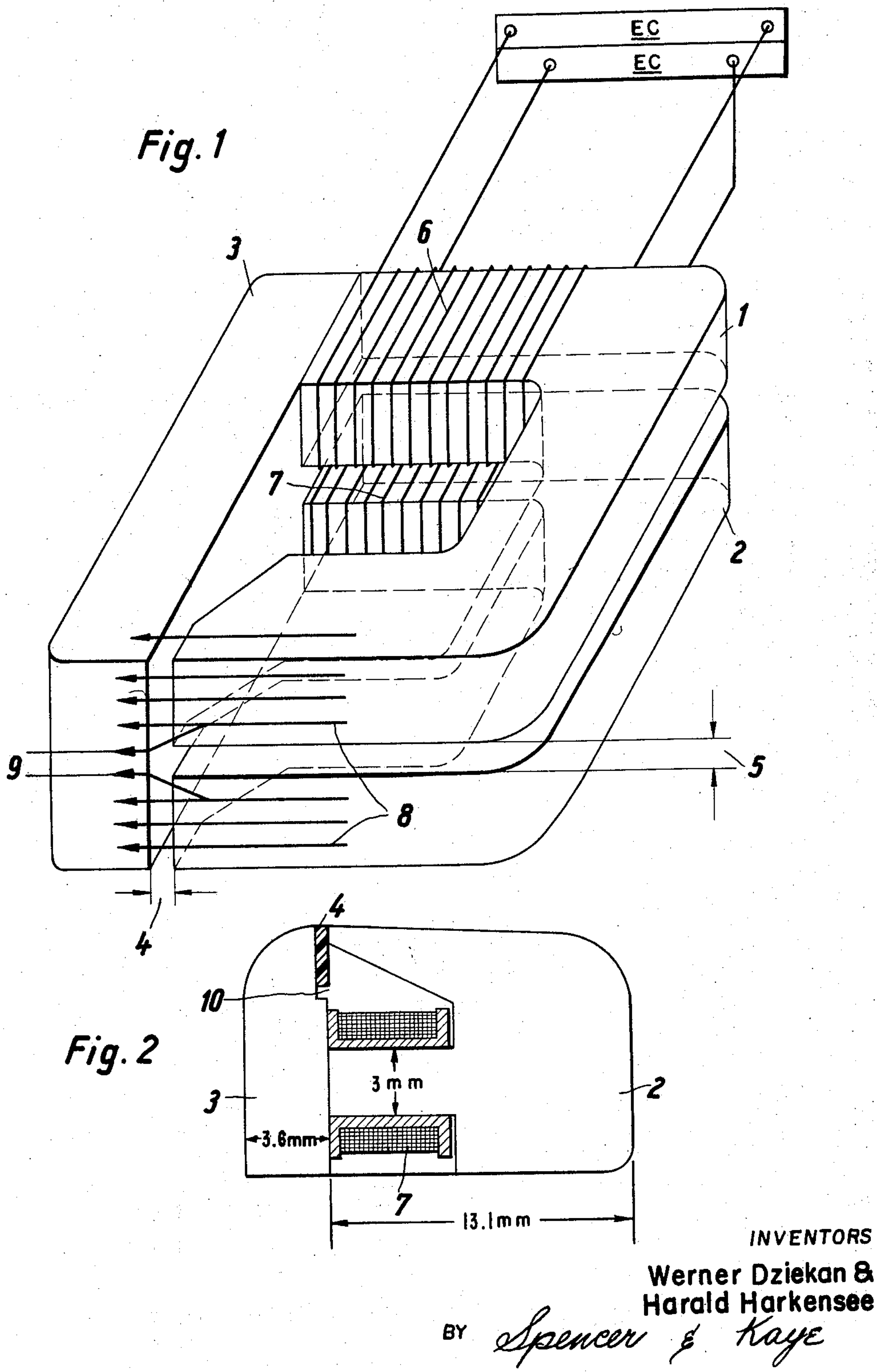
FIGURE 1 is a schematic perspective view of a two-track erase head according to the present invention.
FIGURE 2 is a sectional view of a practical embodiment of an erase head according to the present invention.

With more particular reference to the drawings and to FIGURES 1 and 2 thereof in particular, two core halves 1 and 2 are arranged on the one side of the plane of the gap, the core halves being spaced from each other by a distance 5. The width of the core halves corresponds approximately to that of the tracks written by the write-in or recording head system. The forward poles which have surfaces which aid in defining the operating air gap 4 are tapered inwardly, as is known per se, while the rearward poles carry the exciter windings 6, 7. The magnetic shunt for the magnetic flux produced by the exciter windings 6, 7, is constituted by a plate 3 which takes the place of the otherwise customary separate core halves on the other side of the gap 4. The plate 3 preferably comprises a flat plate which has the same total width as the magnetic tape. As shown in FIGURE 2, a shoulder 10 can be ground into that surface of the plate which lies in the gap plane, this being located at the working air gap. The depth of this abutment or shoulder is at the most equal to the thickness of the insert in the gap. In this way it is possible to grind the surfaces of the plate 3 and the core halves 1 and 2 in such a manner that they lie flatly against each other.

It has been found that if the exciter coils are similarly poled, e.g., wound in the same direction and similarly fed, upon simultaneous feeding of all the cores, not only will a magnetic flux 8 be produced in each core half in the same direction which closes directly over the individual gaps, but also, a flux 9 of about the same amplitude or magnitude will penetrate the zones between the core halves 1 and 2 in the edge of the plate 3, so that the tape is erased, throughout its entire width, with approximately the same field strength. Erasing circuits EC may be used to feed the coils.

The erasing circuits EC can comprise any suitable prior art electrical switching circuits for simultaneously energizing both winding 6 and winding 7, and for independently energizing the two windings, and for shorting one of the windings when the other is energized.

In a practical embodiment involving a gap width of approximately 0.5 millimeter, a track distance of 2 millimeters, and an excitation of 17.5 a.w. per system, it was possible to attain an erasing attenuation of 63 db of a tape which was previously written-in or recorded over the entire track. If the spacing 5 between the two systems is reduced to approximately 1 millimeter, the erasing attenuation of the tape which was previously recorded on over the full track is approximately 70 db.

On the other hand, upon feeding but one system, for example the system 1, the plate 3 prevents a stray flux from flowing through the operating gap of the neighboring system 2, because the stray flux, which enters into the core half 2 transversely from the core half 1, closes the magnetic circuit via the rearward pole and that portion of the plate 3 which is next to it. The magnetic resistance between the rearward poles of the core halves 1 and 2 and the plate 3 is very small as compared to the magnetic resistance which is formed by the forward operating gap of the system 2 for the stray field which is coupled into this system. Consequently, the erasing of the neighboring track in monotrack operation, which has been found to be unavoidable in the case of prior art multiple track erase heads is, according to the present invention, reduced to a value which is no longer susceptible to being measured.

The described flux distribution upon monotrack operation can be used to achieve yet a further advantage. This is done by dimensioning or designing the erase head so that upon the feeding of one system, the stray flux which forms transversely over the neighboring system, is as large as the useful flux in the forward gap of the system which is being fed, the same power is drawn from the generator as in the case of two-track operations, so that it becomes unnecessary to insert a substitute resistance.

The arrangement can be designed by selecting the core parts and the distance between them in such a manner that the magnetic resistance between the core halves, which are provided with the coils, is of the same size as the magnetic resistance between one core half and the plate. Inasmuch as the distance which the core halves are spaced from each other is more or less given by the position of the tracks, this condition can be fulfilled with the customary width of the front air gap 4, by letting the rearward pole lie directly against the plate 3 and by suitably dimensioning the surfaces of the core halves 1 and 2 which lie opposite each other.

According to another possibility, the core halves or the distance between them can be so dimensioned that the magnetic resistance between the core halves which are provided with the coils is so much smaller than the magnetic resistance between one core half and the plate, that the stray flux between the core halves is, due to the effective magnetic short circuit of the core of the neighboring system which is not being fed, weakened down to the amplitude of the useful flux in the system which is being fed. This solution has the advantage that when one switches over from monotrack operation to multiple track operation or vice versa, no switch-over pulses are recorded on the magnetic tape.

In the case of studio magnetic tape recorders, i.e., high performance or high quality tape recorders, which should have exceptionally high characteristics insofar as the erasing of recorded intelligence from bands is concerned, it is known, for purposes of increasing the erasing attenuation to use erasing heads having two air gaps, preferably of different widths, and which follow each other in the direction of travel of the magnetic tape, so that the magnetic layer on the tape will successively run through two fields having different vector directions. In such apparatus, there is the requirement that the tape be erased over its entire width, in order to allow for the interchange of tapes for use in multiple track recording. This can be obtained in a simple manner by providing a second pole plate which likewise extends over the entire width and is arranged in mirror image symmetry to the first pole plate on the opposite side of the core parts which are provided with the windings.

FIGURES 3*a* and 3*b* show two pole plates 11 and 12 which extend over the entire width of the head and have approximately U-shaped configurations. In mirror image symmetry, they include between them two rod-shaped core parts 13 and 14 whose widths correspond approximately to that of the tracks of the magnetic tape. The two core parts 13 and 14 are each provided with an exciter winding 18. Arranged between the core parts 13 and 14 are, at the pole ends, two non-magnetic spacer pieces 17, preferably made of ceramic, the forward spacer piece with its end surface at the same time being a part of the surface of the head. At the front side the pole plates 11, 12, form with the pole pieces 13 and 14 air gaps 15 and 16. The operating air gap 16 is the second air gap considered in the direction of travel of the magnetic tape and, in a manner known per se, is narrower than the air gap 15.

The dimensioning of the magnetic resistances for the two systems is carried out in the same manner as the embodiment in FIGURES 1 and 2, namely, in such a manner that the stray flux which is coupled from the middle piece 13 into the middle piece 14, or vice versa, can not, upon the excitation of but one winding, flow through the magnetic path across the forward operating air gaps 15 and 16 and the pole plates 11 and 12, but rather flows through the magnetic path transversely from core part 13 to core part 14 via the rearward ends of the pole plates 11 and 12 which abut directly against the core pieces 13 and 14. In this way, the erasing of a neighboring track is, in the case of monotrack operation, substantially prevented whereas when both windings are energized, the interspace 17 at the two air gaps will, due to the magnetic flux going through pole plates 11 and 12 be reached by the erasing field.

The embodiment of FIGURES 4*a* and 4*b* differs from that in FIGURES 3*a* and 3*b* only in that the middle pole pieces 13′ and 14′ have a substantially double T-shaped configuration and the outer pole plates are flat, and corresponding elements are similarly numbered but with primes added.

In a practical embodiment of a dual track head according to FIG. 2 using ferrite as core material the following dimensions may be chosen:

Seen in the direction of tape travel: plate 3=3.6 mm., working air gap=0.45 mm., core halves 2=13.1 mm., coil carrying rear ends=5.2 mm.

Seen transverse to the direction of tape travel: plate 3=10.5 mm., pole tip of core halves=0.5 mm., coil carrying rear ends=3 mm.

Width of plate 3=6.35 mm., width of core halves=2.7 mm. each, space between core halves=1 mm., excitation per system=17.5 ampere windings.

With the above dimensions, upon the feeding of one system and with the coil of the other system short circuited, the necessary input power will be the same as upon the feeding of both systems.

It will be understood that the above description of the present invention is susceptible to various changes, modifications and adaptations, and the same are intended to be comprehended within the meaning and range of equivalents of the appended claims.

What is claimed is:

1. A multiple track erase head arrangement for magnetic recording devices, comprising: a plurality of adjacent head systems, one for each track of a magnetic band; a first core half of each system being approximately as wide as the track pertaining thereto and carrying a winding; and the other core halves of each system being defined by a single plate corresponding to the width of a magnetic band, said plate being slightly spaced from one pole end of the first core halves to define an air gap and magnetically bridging along the plane of the gap of the other pole ends; means for simultaneously energizing all of the windings, the direction of the windings and the exciting current being such that a flux of the same phase position and approximately the same amplitude flows through that edge of the plate which is adjacent the gap end, throughout its entire length, said means for simultaneously energizing all of the windings also including means for individually energizing selected windings, the magnetic resistance between said first core halves being of such value with respect to the magnetic resistance of one system including the working air gap to provide upon the energizing of one system that nearly the whole stray flux which passes transversely through the space between said first core halves will close over that portion of the single plate confronting the rear ends of said first core halves, while only a negligible portion of the stray flux will cross the working air gap of the systems which are not energized.

2. An arrangement as defined in claim 1 wherein the other pole ends of said first core halves lie directly against said plate.

3. An arrangement as defined in claim 1 comprising a second pole plate also extending for the width of the arrangement and disposed in mirror image symmetry to the first recited plate on the opposite side of said first core halves, said second plate being slightly spaced from said first core halves and forming therewith a second operating gap.

4. An arrangement as defined in claim 3 wherein said first core halves are rod-shaped and said plates are U-shaped.

5. An arrangement as defined in claim 3 wherein said first core halves are T-shaped at each end and said plates are flat.

6. An arrangement as defined in claim 3 wherein said second gap is narrower than said first recited gap.

References Cited

UNITED STATES PATENTS

| | | | |
|---|---|---|---|
| 2,702,835 | 2/1955 | Camras | 179—100.2 |
| 3,041,413 | 6/1962 | Williams | 179—100.2 |
| 3,102,170 | 8/1963 | Dekoning | 179—100.2 |

BERNARD KONICK, *Primary Examiner.*

J. R. GOUDEAU, *Assistant Examiner.*